(12) United States Patent
Hugon et al.

(10) Patent No.: US 9,644,487 B2
(45) Date of Patent: May 9, 2017

(54) FIXED TURBINE ENGINE RECEIVER PART COMPRISING AN ASSEMBLY FOR HOLDING ANCILLARY SYSTEMS IN POSITION INSIDE A FIXED HOLLOW SHAFT

(71) Applicant: SNECMA, Paris (FR)

(72) Inventors: Nadege Hugon, Montgeron (FR); Gilles Alain Charier, La Grande Paroisse (FR)

(73) Assignee: SNECMA, Paris (FR)

( * ) Notice: Subject to any disclaimer, the term of this patent is extended or adjusted under 35 U.S.C. 154(b) by 736 days.

(21) Appl. No.: 14/164,827

(22) Filed: Jan. 27, 2014

(65) Prior Publication Data

US 2015/0047369 A1    Feb. 19, 2015

(30) Foreign Application Priority Data

Jan. 30, 2013    (FR) ..................................... 13 50766

(51) Int. Cl.
*F02C 7/32* (2006.01)
*F01D 25/18* (2006.01)
(Continued)

(52) U.S. Cl.
CPC ............ *F01D 9/065* (2013.01); *F01D 25/16* (2013.01); *F01D 25/18* (2013.01); *F01D 25/28* (2013.01);
(Continued)

(58) Field of Classification Search
CPC .......... F02K 3/072; F02K 3/062; F02K 3/065; F02C 7/06; F02C 7/32; F05D 2230/64;
(Continued)

(56) References Cited

U.S. PATENT DOCUMENTS 3,041,832 A * 7/1962 Atkinson ................ F01D 25/18
                                                        184/6.11
4,621,978 A * 11/1986 Stuart ...................... F01D 7/00
                                                        415/65
(Continued)

FOREIGN PATENT DOCUMENTS

DE    1 149 574         5/1963
EP    0 626 503 A1      11/1994
(Continued)

OTHER PUBLICATIONS

Preliminary Search Report issued Nov. 14, 2013 in French Patent Application No. FR 1350765 FA775962 (with English Translation of Category of Cited Documents).

(Continued)

*Primary Examiner* — Andrew Nguyen
(74) *Attorney, Agent, or Firm* — Oblon, McClelland, Maier & Neustadt, L.L.P.

(57) ABSTRACT

The invention relates to a fixed turbine engine receiver part comprising a fixed hollow shaft for carrying ancillary systems of a turbine engine, centered on the turbine engine axis, turbine engine ancillary systems, an assembly for holding ancillary systems in position situated inside the fixed hollow shaft. The assembly for holding ancillary systems in position comprises at least one first ancillary system support ring, having an axis substantially parallel with the turbine engine axis, a first distance sleeve for holding the first ancillary system support ring in position, having an axis substantially parallel with the turbine engine axis, the first distance sleeve bearing against the first support ring, such that the first support ring comprises a plurality of mutually separated through holes, each through hole defining a passage for at least one ancillary system, each through hole being traversed by at least one of the ancillary systems of the turbine engine.

13 Claims, 6 Drawing Sheets

(51) Int. Cl.
- *F01D 9/06* (2006.01)
- *F01D 25/28* (2006.01)
- *F01D 25/16* (2006.01)
- *F02K 3/072* (2006.01)
- *F02C 3/067* (2006.01)

(52) U.S. Cl.
CPC ............... *F02C 3/067* (2013.01); *F02C 7/32* (2013.01); *F02K 3/072* (2013.01); *F05D 2220/323* (2013.01); *F05D 2230/64* (2013.01); *F05D 2240/50* (2013.01); *F05D 2240/61* (2013.01); *F05D 2250/70* (2013.01); *F05D 2260/30* (2013.01); *F05D 2260/40* (2013.01); *F05D 2260/96* (2013.01); *Y02T 50/671* (2013.01); *Y10T 29/49826* (2015.01)

(58) Field of Classification Search
CPC ............. F05D 2240/14; F05D 2240/61; F05D 2240/63; F05D 2260/30; F05D 2260/98; F01D 9/02; F01D 9/06; F01D 9/065; F01D 9/04; F01D 25/18; F01D 25/16; F01D 25/28

See application file for complete search history.

(56) References Cited

U.S. PATENT DOCUMENTS

| | | |
|---|---|---|
| 4,657,484 A | 4/1987 | Wakeman et al. |
| 4,693,672 A | 9/1987 | Carvalho |
| 5,090,869 A | 2/1992 | Wright |
| 2004/0062460 A1 | 4/2004 | Dusserre-Telmon et al. |
| 2010/0128848 A1 | 5/2010 | Qiu et al. |
| 2011/0164978 A1 | 7/2011 | Swift et al. |
| 2011/0243735 A1 | 10/2011 | Balk et al. |
| 2011/0311361 A1 | 12/2011 | Charier et al. |
| 2012/0099988 A1 | 4/2012 | Charier et al. |
| 2013/0011259 A1 | 1/2013 | Balk et al. |

FOREIGN PATENT DOCUMENTS

| | | |
|---|---|---|
| EP | 1 406 026 A1 | 4/2004 |
| EP | 1 640 591 A1 | 3/2006 |
| FR | 2 574 125 A1 | 6/1986 |
| FR | 2 960 908 A1 | 12/2011 |
| FR | 2 969 714 A1 | 6/2012 |
| GB | 803 050 A | 10/1958 |
| GB | 2 231 623 A | 11/1990 |
| GB | 2 231 632 A | 11/1990 |
| WO | WO 2010/002294 A1 | 1/2010 |

OTHER PUBLICATIONS

Preliminary Search Report issued Nov. 13, 2013 in French Patent Application No. FR 1350766 FA 776751 (with English translation of Category of Cited Documents).

French Preliminary Search Report issued Nov. 13, 2013, in French Application No. 13 50766 filed Jan. 30, 2013 (with English Translation of Categories of Cited Documents), 2 pages.

French Preliminary Search Report issued Aug. 28, 2014, in French Patent Application No. 1361992 with English translation of category of cited documents.

\* cited by examiner

FIXED TURBINE ENGINE RECEIVER PART COMPRISING AN ASSEMBLY FOR HOLDING ANCILLARY SYSTEMS IN POSITION INSIDE A FIXED HOLLOW SHAFT

FIELD OF THE INVENTION

The invention relates to the technical field of fixed aircraft turbine engine receiver parts comprising a fixed hollow shaft for carrying ancillary systems of the turbine engine. More specifically, the invention relates to a fixed turbine engine receiver part, comprising a fixed hollow shaft for carrying ancillary systems of a turbine engine, a method for mounting this part, a receiver of an open rotor contra-rotating tandem propeller receiver turbine engine comprising such a part and the associated turbine engine. A turbine engine comprising an open rotor contra-rotating tandem propeller receiver is also known as an open rotor turbine engine.

STATE OF THE RELATED ART

Rotary turbine engine shafts are supported and guided in rotation by bearings requiring a continuous supply of lubricant, notably oil, so as to limit the frictional wear thereof. Various turbine engine sensors need to be electrically powered. Ancillary lubricant supply systems and ancillary electrical systems are thus provided in the turbine engine.

In conventional turbine engine designs according to the prior art, ancillary supply systems are placed in fixed casings. Nevertheless, as the casings of the two contra-rotating propellers of a turbine engine with an open rotor tandem contra-rotating propeller receiver rotate about the turbine engine axis, it is difficult to insert ancillary supply systems therein.

Moreover, when seeking to carry turbine engine ancillary systems over long distances, the vibrations generated by the turbine engine in operation and the risks of untimely contacts between the ancillary systems, in particular sudden contacts of ancillary systems of very different types, may prove to be problematic. For example, oil leaks may occur on ancillary lubricant systems liable to damage the turbine engine.

In order to limit fuel consumption, it is preferable to be able to reduce the mass of the turbine engine. It is also preferable to limit the volume of a fixed turbine engine receiver part comprising means for carrying ancillary systems, particularly in the central part of the turbine engine where there is considerable congestion.

For this reason, there is an ongoing need for fixed part of an open rotor contra-rotating tandem propeller turbine engine receiver comprising means for carrying turbine engine ancillary systems, having a relatively simple design, limited mass and size, which is suitable for limiting insofar as possible the risks of ancillary system damage, notably due to vibratory phenomena and untimely contacts between the ancillary systems.

DESCRIPTION OF THE INVENTION

The aim of the invention is that of solving the problems encountered in the solutions according to the prior art. It is particularly intended to enhance a fixed part of a turbine engine receiver comprising means for carrying ancillary systems of the turbine engine, so that the fixed receiver part is of limited mass and size, and that it is suitable for limiting insofar as possible the risks of ancillary system damage, notably due to vibratory phenomena and untimely contacts between the ancillary systems, while having a relatively simple design.

In this regard, the invention relates to a fixed receiver part of a turbine engine comprising a turbine engine axis, the fixed turbine engine receiver part comprising:
  a fixed hollow shaft for carrying ancillary systems of a turbine engine, centered on the turbine engine axis,
  turbine engine ancillary systems,
  an assembly for holding ancillary systems in position, situated inside the fixed hollow shaft for carrying ancillary systems, comprising:
  at least one first ancillary system support ring, having an axis substantially parallel with the turbine engine axis,
  a first distance sleeve for holding the first ancillary system support ring in position, having an axis substantially parallel with the turbine engine axis, the first distance sleeve bearing against the first support ring,
  the first support ring comprising a plurality of mutually separated through holes, each through hole defining a passage for at least one ancillary system, each through hole being traversed by at least one of the ancillary systems of the turbine engine.

By carrying a plurality of ancillary systems which may be of various types in the same fixed hollow shaft, the size and mass of the fixed turbine engine receiver part may be reduced.

The turbine engine ancillary systems carried by the fixed receiver part according to the invention may be for example ancillary systems for lubricating a propeller pitch change mechanism, ancillary systems for lubricating rotary shaft bearings, ancillary electrical systems. They may also be of different diameters.

The assembly for holding ancillary systems in position, particularly the engagement of the first support ring and the first distance sleeve in this assembly, is suitable for limiting the risks of ancillary system damage, notably due to vibratory phenomena and untimely contacts between the ancillary systems.

By limiting the risks of ancillary lubricant system damage, parasitic leaks liable to damage the turbine engine prematurely may partly be prevented.

The invention may optionally comprise one or a plurality of the following features taken alone or in combination:

The fixed turbine engine receiver part is preferably designed so that the assembly for holding ancillary systems in position remains rigidly connected to the fixed hollow shaft for carrying ancillary systems, including during turbine engine operation.

This results in superior holding of the ancillary systems in position and, consequently, a lower risk of turbine engine ancillary system damage.

It is possible for a plurality of ancillary systems to pass through the same through hole of the first support ring. In this case, ancillary systems of the same type, for example ancillary electrical systems, are preferably involved.

The first support ring may be segmented. In this case, it comprises at least two complementary assembly segments, preferably three complementary assembly segments, each defining, at least in part, at least one of the through holes.

The presence of complementary assembly segments enables greater modularity of the assembly for holding turbine engine ancillary systems in position. It becomes easier to adapt the design of each through hole according to the ancillary systems to be carried.

The assembly for holding ancillary systems in position preferably comprises a second distance sleeve for holding the first ancillary system support ring in position, having an axis substantially parallel with the turbine engine axis, the first support ring being locked along the fixed hollow shaft for carrying ancillary systems between the first distance sleeve and the second distance sleeve.

The first support ring may be locked while bearing both against the first and second distance sleeve. The first and the second distance sleeve may notably lock the first support ring in translation along the fixed hollow shaft for carrying ancillary systems.

The assembly for holding ancillary systems in position may comprise means for angular locking of the first support ring in relation to the first distance sleeve.

The first support ring may thus be locked in rotation inside the fixed hollow shaft for carrying ancillary systems, limiting the risks of turbine engine ancillary system damage.

The first and the second distance sleeve may notably be suitable for both locking in translation and angular locking of the first support ring.

Preferably, the subassembly, comprising a first part consisting of the first support ring, and a second part comprising a distance sleeve chosen from the first of the second distance sleeve, is designed in such a way that the first part comprises a notch or a projecting part designed to engage with a corresponding notch or projecting part of the second part.

The fixed receiver part may comprise a first axial stop rigidly connected to the fixed hollow shaft for carrying ancillary systems, bearing against the assembly for holding ancillary systems in position, the first axial stop preferably comprising a flexible element.

The first axial stop helps lock the assembly for holding ancillary systems in position, particularly the first support ring, inside the fixed hollow shaft for carrying ancillary systems.

The fixed receiver part may comprise a second axial stop rigidly connected to the fixed hollow shaft for carrying ancillary systems, bearing against the assembly for holding ancillary systems in position, the assembly for holding ancillary systems in position being locked inside the fixed hollow shaft for carrying ancillary systems between the first axial stop and the second axial stop, the second axial stop preferably comprising an abutment for holding, in position, the assembly for holding ancillary systems in position.

Locking the assembly for holding ancillary systems in position inside the fixed hollow shaft is suitable for limiting the risks of ancillary system damage further, notably due to vibratory phenomena and untimely contacts between the ancillary systems. The abutment of the second axial stop may notably favor locking of the assembly for holding ancillary systems in position.

The subassembly, comprising a first part consisting of the assembly for holding ancillary systems in position and a second part comprising the wall of the fixed hollow shaft, may be designed in such a way that the first part comprises a notch or a projecting part designed to engage with a corresponding notch or projecting part of the second part.

The assembly for holding ancillary systems in position preferably comprises a second ancillary system support ring and a third ancillary system support ring, each support ring having an axis substantially parallel with the turbine engine axis, each support ring comprising a plurality of mutually separated through holes, each through hole defining a passage for at least one ancillary system, each through hole being traversed by at least one of the ancillary systems of the turbine engine, the second support ring being locked between the first axial stop and the first distance sleeve, the third support ring being locked between the second distance sleeve and the second axial stop.

The second axial stop may comprise an internal flexible element situated between an inner wall of the fixed hollow shaft and the third support ring with which the internal flexible element is in contact, the internal flexible element being designed to maintain tightness between the third support ring and the fixed hollow shaft.

The internal flexible element is suitable for keeping the assembly for holding ancillary systems in position and the second axial stop in contact more effectively. The internal flexible holding element may particularly facilitate the engagement of the abutment of the second axial stop and the assembly for holding ancillary systems in position, particularly the return to the abutment of the assembly for holding ancillary systems in position when it is moved slightly in relation to the abutment. The internal flexible element is for example an elastic seal.

The invention also relates to a turbine engine comprising an open rotor contra-rotating tandem propeller receiver comprising a fixed receiver part as defined above.

The invention also relates to a method for mounting a fixed turbine engine receiver part:
 a step for mounting the first distance sleeve, along an axis substantially parallel with the turbine engine axis, whereby the first distance sleeve is made to bear against the first support ring so as to be subsequently able to hold the first support ring in position inside the fixed hollow shaft for carrying ancillary systems,
 a step for mounting the assembly for holding ancillary systems in position inside the fixed hollow shaft for carrying ancillary systems,
 a step for mounting at least one ancillary system inside the fixed hollow shaft for carrying ancillary systems via at least one through hole of the first support ring.

Due to the relative simplicity thereof, the fixed receiver part may be relatively easy to mount.

The fixed receiver part may also comprise a nozzle rigidly connected to the shaft for carrying ancillary systems. In this case, the fixed hollow shaft for carrying ancillary systems is notably a fixed lubricant supply shaft defining a passage for at least one ancillary system for supplying lubricant to a turbine engine rotary shaft bearing. The nozzle is then designed to spray the lubricant radially out of the fixed hollow shaft on the turbine engine rotary shaft bearing. The first support ring is then designed to carry the lubricant from the ancillary system for lubricating the bearing to the nozzle.

As the nozzle and the ancillary system for bearing lubrication are essentially arranged inside the fixed hollow shaft, they do not disrupt the modularity of the receiver, particularly the rotation of a first rotary assembly comprising a first propeller and a second rotary assembly in the opposite direction of the first, comprising a second propeller.

The fixed receiver part offers the advantage of having a simple design, notably due to the arrangement of the nozzle. The arrangement of the nozzle in relation to the lubricant supply shaft also contrasts with existing solutions.

BRIEF DESCRIPTION OF THE FIGURES

The present invention will be understood more clearly on reading the description of examples of embodiments, which are given merely as an indication and are in no way limiting, with reference to the appended figures wherein.

DETAILED DESCRIPTION OF PARTICULAR EMBODIMENTS

Identical, similar or equivalent parts of the various figures bear the same numeric references for an easier transition from one figure to another.

The various alternative embodiments and the various embodiments should be understood as not being mutually exclusive and may be combined.

Figure 1:
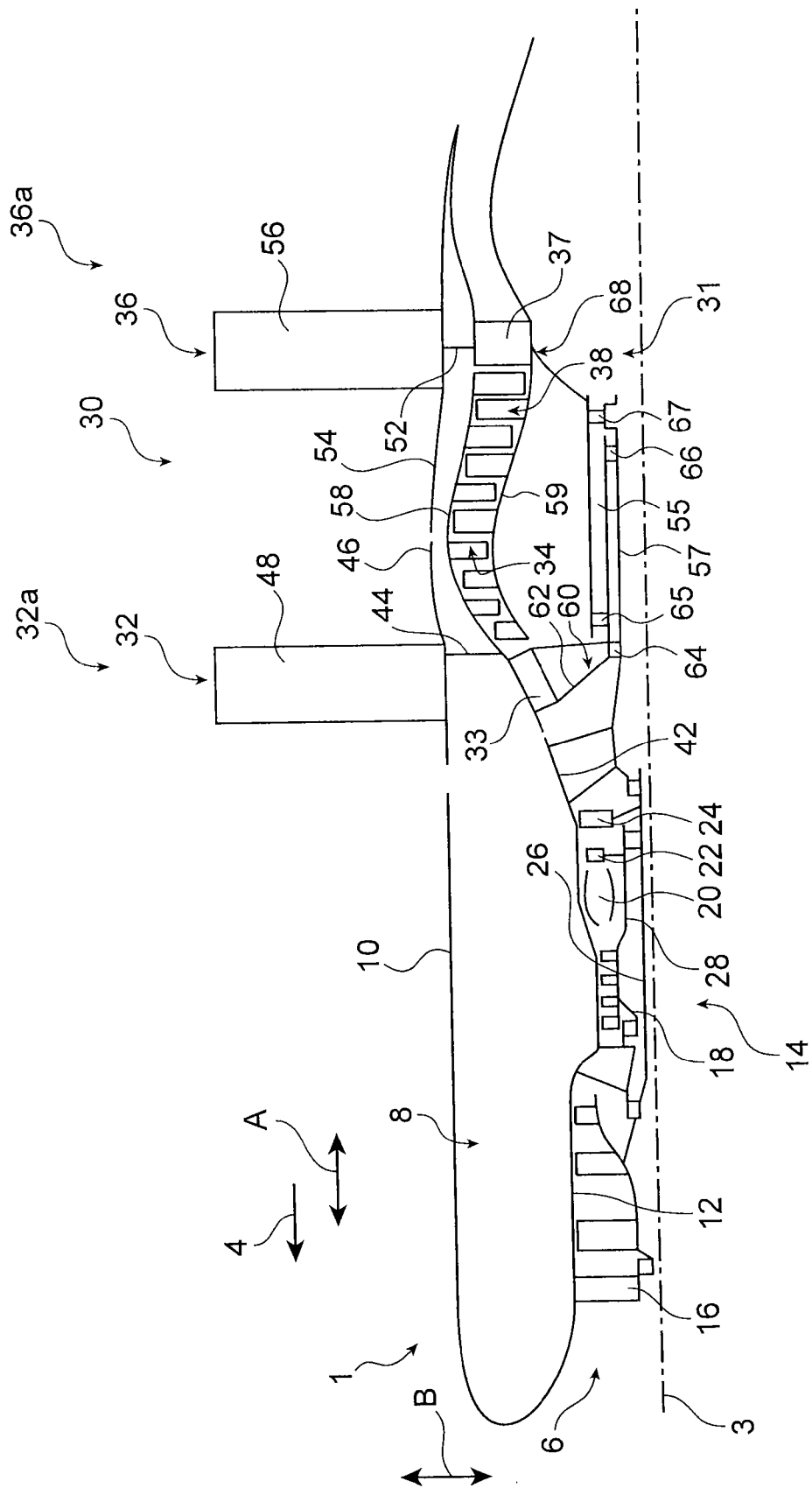
FIG. 1 represents a schematic longitudinal half-section view of an open rotor tandem propeller receiver for an aircraft turbine engine.

FIG. 1 schematically represents a turbine engine 1 having open rotor contra-rotating tandem propellers 32, 36 of the "Direct Drive" type, according to a conventional embodiment of the prior art, such as that notably known from FR2969714A1. In other words, it was chosen to describe the invention implemented on a turbine engine 1 wherein the receiver 30 is moved directly by the propulsion of gases from at least one free power turbine. A fixed receiver part 30 according to the invention may also be arranged on an open rotor contra-rotating tandem propeller turbine engine comprising a differential gear receiver (not shown).

In FIG. 1, the direction A corresponds to the longitudinal direction or axial direction, parallel with the longitudinal axis 3 of the turbine engine. The direction B corresponds to the radial direction of the turbine engine. Furthermore, the arrow 4 schematically represents the direction of aircraft travel under the action of the thrust from the turbine engine 1, this travel direction being opposite the main gas flow direction in the turbine engine. The terms "front", "upstream", "rear", "downstream" used hereinafter in the description are to be considered in relation to the travel direction 4.

In the front part, the turbine engine has an air inlet 6 continuing to the rear via a nacelle 8, said nacelle 8 generally comprising an outer skin 10 and an inner skin 12, both centered on the axis 3 and mutually radially offset.

The inner skin 12 acts as an outer radial casing for a gas generator 14, comprising conventionally, from the front to the rear, a low-pressure compressor 16, a high-pressure compressor 18, a combustion chamber 20, a high-pressure turbine 22, and an intermediate pressure turbine 24. The compressor 16 and the turbine 24 are mechanically connected by a shaft 26, thus forming a low-pressure assembly, whereas the compressor 18 and the turbine 22 are mechanically connected by a shaft 28, forming a higher pressure assembly. Consequently, the gas generator 14 preferably has a conventional, or twin-spool, design.

Downstream from the intermediate pressure turbine 24, an open rotor contra-rotating tandem propeller receiver 30 is situated, said propellers being driven by at least one free power turbine. More specifically, this receiver 30 is arranged downstream from a fixed casing 42, in turn arranged in the rear extension of the outer radial casing 12 of the gas generator 14. Moreover, the casings 12 and 42 may be made of one piece. The fixed casing 42 is then extended to the rear while retracting along the radial direction, to form a fixed shaft 57 centered on the axis 2, acting as the fixed casing of the receiver 30. The fixed hollow shaft 57 will be described in more detail with reference to FIGS. 2 to 7.

The receiver 30 firstly comprises a first rotary assembly 32a equipped with a first propeller 32, a first free power turbine 34 driving this propeller, and a first rotary structural device 33 situated in the axial extension of the free turbine 34 to the front, while being inserted between the first stage of this turbine and the fixed casing 42. The rotary structural device 33 generally adopts the form of a plurality of mutually circumferentially spaced arms, extending radially. These arms are connected to the first propeller 32 while carrying the outer casing 58, in turn connected to the propeller 32 particularly by means of a flange or a plurality of clips 44 suitable for offsetting this propeller 32 radially outward. The clips 44 have an inner radial end rigidly connected to the outer casing 58, and an outer radial end rigidly connected to the outer casing 46, or a polygonal ring (not shown) for supporting the blades 48. The clips 44, the blade supports, require dynamic lubrication, which may be performed using lubricant carried by a fixed part 31 of a receiver 30 which will be described in more detail with reference to FIGS. 2 to 7. The blades 48 project radially outward from this casing 46, wherein one of the specificities is that of being situated in the rear aerodynamic continuity of the outer nacelle skin 10.

Similarly, the receiver 30 comprises a second rotary assembly 36a equipped with a second propeller 36, a second free power turbine 38 driving this propeller, and a second rotary structural device 37 situated in the axial extension of the free turbine 38 to the rear, being situated behind the final stage of this turbine. The rotary structural device 37, extending essentially radially, supports the second propeller 36 to which it is connected particularly by means of a flange or a plurality of clips 52 suitable for offsetting the propeller 36 outward. The clips 52 have an inner radial end rigidly connected to the rotary structural casing 37, and an outer radial end rigidly connected to an outer propeller casing 54, or a polygonal ring (not shown) for supporting the blades 56. These blades 56 project radially outward from this casing 54, which is situated in the rear aerodynamic continuity of the outer casing 46 of the first propeller 32. This design is typical of an open rotor turbine engine.

Moreover, the first and second free turbines 34, are interlocked so as form a tandem of contra-rotating turbines. The stages of the first turbine are thus arranged in alternation with the stages of the second turbine, in the direction A. This tandem is thus also comparable to a turbine with two contra-rotating rotors. As an indication, the free turbines 34, 38 do not have any direct mechanical link with the rotary components of the gas generator, i.e. they neither drive nor are driven by the elements 16, 18, 22, 24. Only the gases discharged from the intermediate pressure turbine 24 thus rotate these free turbines 34, 38 acting as the tandem of contra-rotating turbines.

The outer rotary casing 58 of this tandem is defined by the first turbine, suitable for describing same as an outer turbine, whereas the inner rotary casing 59 of the tandem is defined by the second turbine, or inner turbine.

The receiver 30 comprises a first support structure 60 of the first rotary assembly 32a. It comprises first support means 62 bearing the first rotary structural device 33, in turn bearing the outer casing 58 of the tandem of turbines at the front end of the first turbine 34. The first support means 62 are in turn borne by two roller bearings 64, 66 arranged about the fixed hollow shaft 57 and axially offset from each other. The fixed hollow shaft 57 serves to carry the ancillary supply systems of the turbine engine 1, notably the ancillary electrical systems and ancillary lubrication oil systems of the bearings 64, 66.

Furthermore, the receiver 30 comprises a second support structure 68 of the second rotary assembly 36a. This second support structure 68 is also borne by an inter-turbine roller bearing 65 inserted between the first support means 62 and the second support structure 68. The second support structure 68, bearing the structural device 37, is borne by a roller bearing 67 borne by a rotary shaft 55. The rotary shaft 55 is arranged about the fixed hollow shaft 57.

Figure 2:
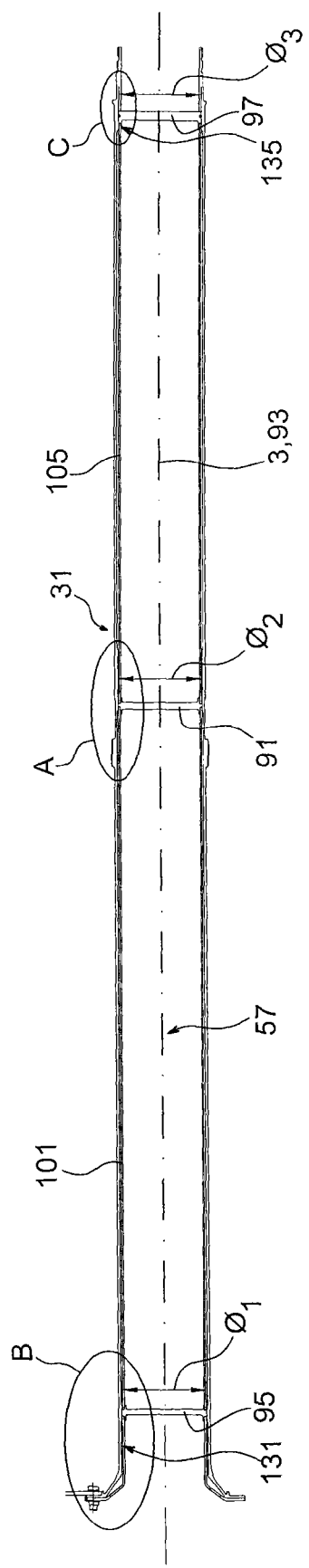
FIG. 2 is a schematic section view along a longitudinal median plane of the fixed hollow shaft for carrying ancillary systems of a fixed receiver part according to a first embodiment of the invention.
Figure 6:
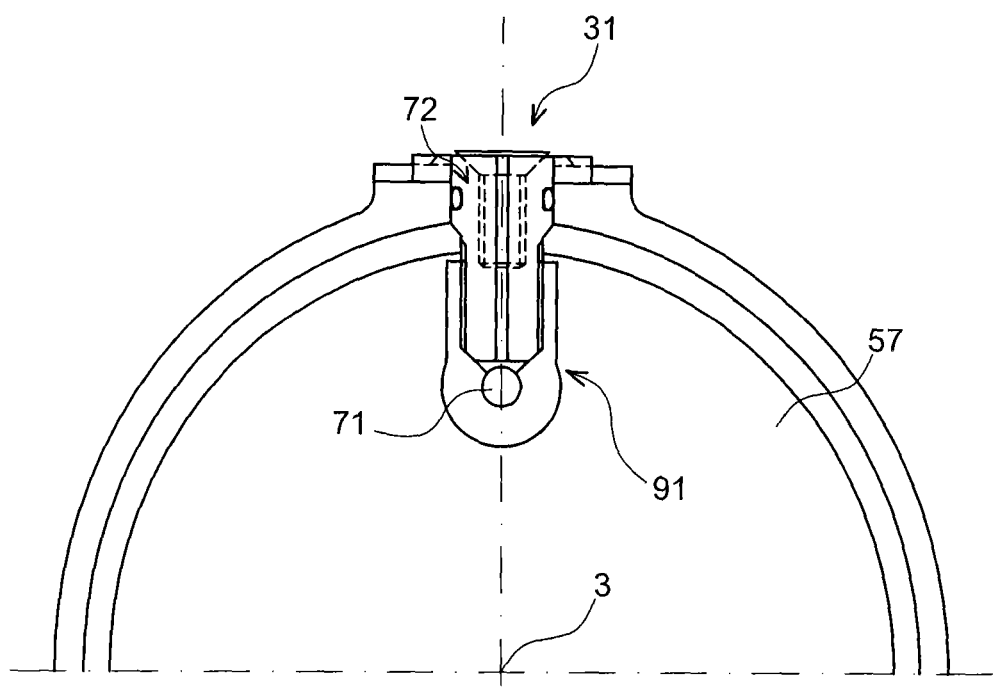
FIG. 6 is a sectional representation along a cross-sectional plane of the fixed hollow supply shaft of the fixed turbine engine receiver part at the first support ring according to a third embodiment of the invention.

With joint reference to FIG. 2 and to FIG. 6, a fixed part 31 of a receiver 30 of a turbine engine 1 comprising an axis 3 of a turbine engine 1 is shown, designed to be able to carry ancillary systems 71, 75, 77 of the turbine engine 1 via a fixed hollow shaft 57 for carrying ancillary systems 71, 75, 77. The ancillary systems 71, 75, 77 may be varied. They may consist of ancillary electrical systems 75 grouped together in a large-diameter lead assembly. It may consist of ancillary systems 77 for lubricating a propeller pitch change mechanism (not shown). It may further consist of ancillary systems 71 for lubricating rotary shaft bearings 64, 65, 66, 67, preferably roller bearings 64, 66 and 67. The ancillary electrical systems 75 serve for example to power various sensors situated in the vicinity of the end of the fixed hollow shaft 57 for carrying ancillary systems 71, 75, 77, which is also known as a sleeve. Very preferably, the ancillary electrical systems 75 should never come into contact with the ancillary lubrication systems 71, 77 inside the fixed hollow shaft 57.

In addition to the ancillary systems 71, 75, 77, the fixed part 31 of the receiver 30 of the turbine engine 1 comprises the fixed hollow shaft 57 for carrying ancillary systems 71, 75, 77 for supplying the turbine engine 1. The fixed hollow shaft 57 defines a passage for carrying the ancillary systems 71, 75, 77 of the turbine engine 1. The fixed hollow shaft 57 is centered on the axis 3 of the turbine engine 1 and rotates for example about the turbine engine axis 3. As the fixed hollow shaft 57 is situated in the central part of the turbine engine 1, which has a large size, the volume available for the fixed hollow shaft 57 is relatively limited. Moreover, due to the length thereof, the risks of untimely contacts of the ancillary systems 71, 75, 77 are relatively high. The fixed part 31 of the receiver 30 according to the invention, particularly an assembly for holding ancillary systems in position 90, is suitable for adapting to these constraints in a satisfactory manner.

The assembly for holding ancillary systems in position 90 is situated inside the fixed hollow shaft 57 for carrying ancillary systems 71, 75, 77. This assembly 90 comprises at least one first support ring 91 in respect of ancillary systems 71, 75, 77, having an axis 93 substantially parallel with the axis 3 of the turbine engine 1, generally merged with the axis 3 of the turbine engine 1. The first support ring 91 will be described in more detail with reference to FIG. 3 and FIG. 4. The assembly for holding ancillary systems in position 90 is generally symmetrical in rotation in relation to the axis 93 of the first support ring 91. The assembly for holding ancillary systems in position 90 also comprises a first distance sleeve 101 for holding the first ring 91 for supporting ancillary systems 71, 75, 77 in position.

The first distance sleeve 101 bears against the first support ring 91, which is suitable for holding same in position inside the fixed hollow shaft 57 for carrying ancillary systems 71, 75, 77. The first distance sleeve 101 is preferably cylindrical in shape. It has an axis 103 substantially parallel to the axis 3 of the turbine engine 1. Unless in the vicinity of the ends thereof, the first distance sleeve 101 is substantially symmetrical in rotation about the axis 103.

The assembly for holding ancillary systems in position 90 further comprises a second distance sleeve 105 for holding the first support ring 91 for ancillary systems 71, 75, 77 in position. The second distance sleeve 105 has an axis 103 substantially parallel to the axis 3 of the turbine engine 1, which is preferably identical to that of the first distance sleeve 101. As a general rule, the second distance sleeve 105 is generally relatively similar to the first distance sleeve 101, with the possible exception of the ends of each distance sleeve. The first support ring 91 is locked along the fixed hollow shaft 57 for carrying ancillary systems 71, 75, 77 between the first distance sleeve 101 and the second distance sleeve 105. The first 101, or the second distance sleeve 105 notably bear against the first support ring 91.

With reference more particularly to FIG. 2, the assembly for holding ancillary systems in position 90 comprises a second support ring 95 for ancillary systems 71, 75, 77 and a third ancillary system support ring 97. Each support ring 91, 95, 97 has an identical axis 93, substantially parallel with the axis 3 of the turbine engine 1, generally merged with the axis 3 of the turbine engine 1. The second and third support rings 95, 97 are generally similar or identical in structure to the first support ring 91. They will be described in more detail with reference to FIG. 3 and to FIG. 4.

The assembly for holding ancillary systems in position 90 may optionally comprise more than three ancillary system support rings. In this case, it may also comprise further distance sleeves. In particular, if the assembly 90 comprises more than three support rings, it would preferably comprise one less distance sleeve than the support rings. Conversely, if the assembly 90 merely comprises a single support ring, the first support ring 91, it would preferably comprise two distance sleeves, the first and the second distance sleeve 101, 105, on either side of the first support ring 91.

The fixed part 31 of the receiver 30 also comprises a first axial stop 131 which will be described in more detail with reference to FIG. 2B and a second axial stop 135 which will be described in more detail with reference to FIG. 2C. The second support ring 95 is notably arranged in the fixed hollow shaft 57, so as to be locked between the first axial stop 131 and the first distance sleeve 101. Similarly, the third support ring 97 is arranged in the fixed hollow shaft 57 so as to be locked between the second distance sleeve 105 and the second axial stop 135.

Figure 2A:
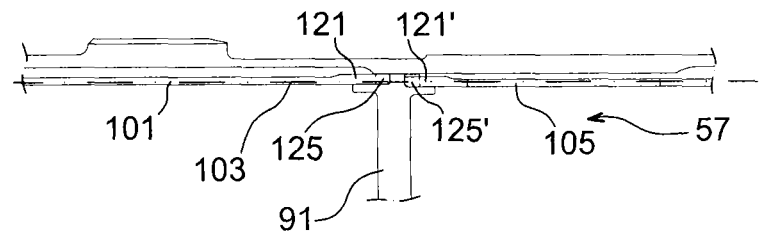
FIG. 2A is an enlargement of detail A in FIG. 2 representing the first support ring locked between the first and the second distance sleeve.

With reference to detail A in FIG. 2 shown in enlarged format in FIG. 2A, the assembly for holding ancillary systems in position 90 further comprises means 121, 125 for angular locking of the first support ring 91 in relation to the first distance sleeve 101. The angular locking means are situated in part on the first distance sleeve 101 and in part on the first support ring 91. They comprise a projecting part from a first part 121 designed to be fixedly housed in a corresponding notch 125 of a second part. In FIG. 2A, the support ring 91 has a notch and corresponds to the second part whereas the first distance sleeve 101 has a projecting part and corresponds to the first part. It is also possible instead to equip the first distance sleeve 101 with a notch engaging with a projecting part of the first support ring 91. Similarly, similar angular locking means 121', 125' are generally provided between the second distance sleeve 105 and the first support ring 91.

Figure 2B:
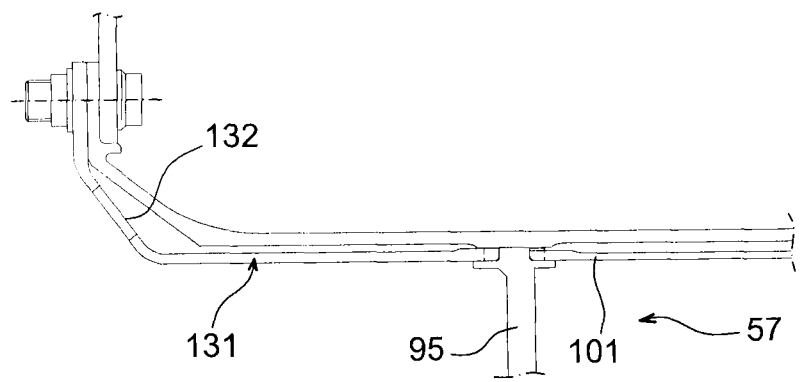
FIG. 2B is an enlargement of detail B in FIG. 2 representing the first axial stop.

The fixed part 31 of the receiver 30 comprises a first axial stop 131, shown in detail in FIG. 2B, rigidly connected to the fixed hollow shaft 57 for carrying ancillary systems 71, 75, 77. The first axial stop 131 helps lock the assembly for holding ancillary systems in position 90 inside the fixed hollow shaft 57 for carrying ancillary systems 71, 75, 77. The first axial stop 131 notably bears against the assembly for holding ancillary systems in position 90. It preferably comprises a flexible element 132.

Figure 2C:
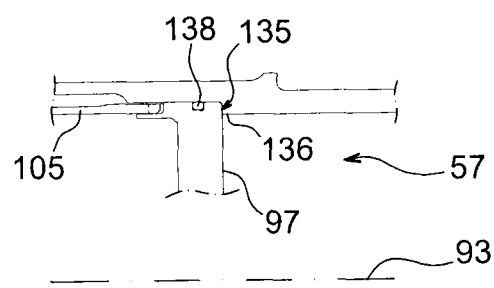
FIG. 2C is also an enlargement of detail C in FIG. 2 representing the second axial stop.

With reference to FIG. 2C, the fixed part 31 of the receiver 30 comprises a second axial stop 135 rigidly connected to the fixed hollow shaft 57 for carrying ancillary systems 71, 75, 77. The second axial stop 135 notably bears against the assembly for holding ancillary systems in position 90. This assembly 90 is then locked inside the fixed hollow shaft 57 for carrying ancillary systems 71, 75, 77 between the first axial stop 131 and the second axial stop 135.

Generally, the second axial stop 135 comprises an abutment 136 for holding, in position, the assembly for holding ancillary systems in position 90. The abutment 136 of the second axial stop 135 favors locking the assembly for holding ancillary systems in position 90 inside the fixed hollow shaft 57. More specifically, the third support ring 97 comprises a projecting part abutting on a gap 136 in a wall of fixed hollow shaft 57.

The second axial stop 135 generally comprises an inner flexible element 138 situated between an inner wall of the fixed hollow shaft 57 and the third support ring 97 with which the inner flexible element 138 is in contact, the inner flexible element 138 being designed to ensure tightness between the third support ring 97 and the fixed hollow shaft 57. The inner flexible element 138 is for example an elastic seal. It is situated between the third support ring 57 and a notch created in the third support ring 97.

With joint reference to FIGS. 2, 2A, 2B, 2C, not only is the assembly for holding ancillary systems in position 90 substantially symmetrical in relation to the axis 93 of the first support ring 91, which is generally merged with the axis 3 of the turbine engine 1, but the fixed part 31 of the receiver 30 is also preferably symmetrical in relation to this axis 3. That is to say, it notably preferably comprises a first axial stop 131 in respect of rotation and a second axial stop 135 also in respect of rotation.

Figure 3:
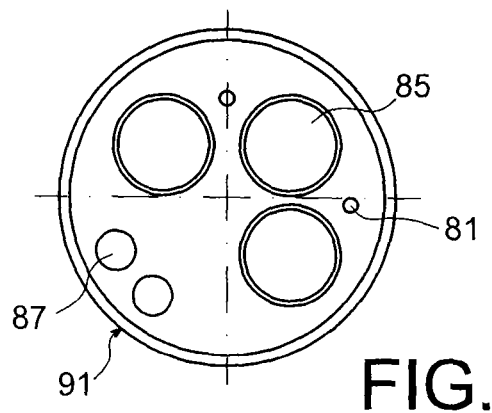
FIG. 3 is a view along a cross-sectional plane of the first support ring represented in FIG. 2.

With reference to FIG. 3, each support ring 91, 95, 97 comprises a plurality of mutually separated through holes 81, 85, 87. Each through hole 81, 85, 87 of each support ring 91, 95, 97 defines a passage for at least one ancillary system 71, 75, 77. Each through hole 81, 85, 87 is traversed by at least one of the ancillary systems 71, 75, 77 of the turbine engine 1. Each through hole 81, 85, 87 has a design, notably a diameter, suitable for the dimensions of the ancillary system(s) 71, 75, 77 traversing same, so as to hold this or these ancillary system(s) 71, 75, 77 firmly in position. The through holes of various support rings are arranged if required opposite each other so as to be able to carry the ancillary systems 71, 75, 77 along the fixed hollow shaft 57 from one ring to another. The various support rings 91, 95, 97 may in particular not always have the same number of through holes, as is the case in the embodiments shown in 6 and 7. Generally, each through hole 81, 85, 87 is circular in shape, like the ancillary system(s) 71, 75, 77, traversing same.

Each support ring 91, 95, 97 is generally solid with the exception of the through holes 81, 85, 87 created at various points. It is generally of a circular shape suitable for the design of the fixed hollow shaft 57 and small in thickness in relation to the length of the fixed hollow shaft 57.

Figure 4:
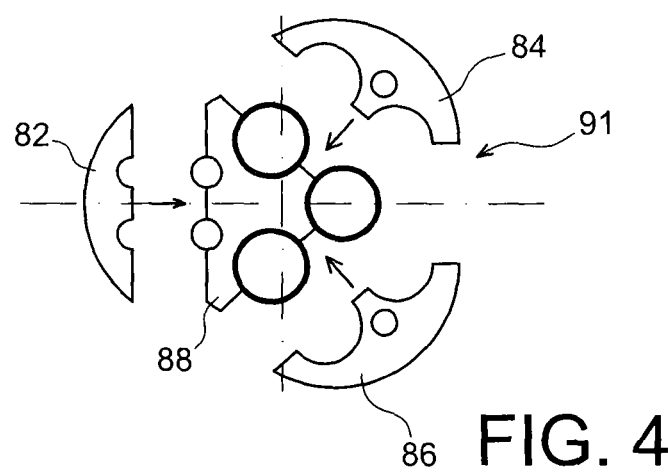
FIG. 4 represents an exploded view of the first segmented support ring comprising at least two complementary assembly segments, according to a second embodiment of the invention.

With reference to FIG. 4, in a second embodiment of the invention, the first support ring 91 is segmented. It comprises at least two complementary assembly segments 82,84, preferably three complementary assembly segments 82, 84, 86, each defining, at least in part, at least one of the through holes 81, 85, 87. The three complementary assembly segments are preferably attached to a central segment 88. Similarly, the other support rings, notably the second and the third support ring 95, 97, may comprise or consist of complementary assembly segments.

The second and the third support ring 95, 97 are different from the first support ring 91 in that they bear on a distance sleeve chosen from the first 101 or the second distance sleeve 105 and not both. Moreover, the second support ring 95 comprises angular locking means with the first distance sleeve 101 and the first axial stop 131 which are similar to those of the first support ring 91 with the first and the second distance sleeve 101, 105. The diameter $\Phi_1$ of the second support ring 95 is generally greater than that $\Phi_2$ of the first support ring 91 which is also greater than that $\Phi_3$ of the third support ring 97. In this case, the support rings 91, 95, 97 are mounted in the fixed hollow shaft 57 in this order: first the third support ring 97, followed by the first 91 and finally the second 95.

Figure 5:
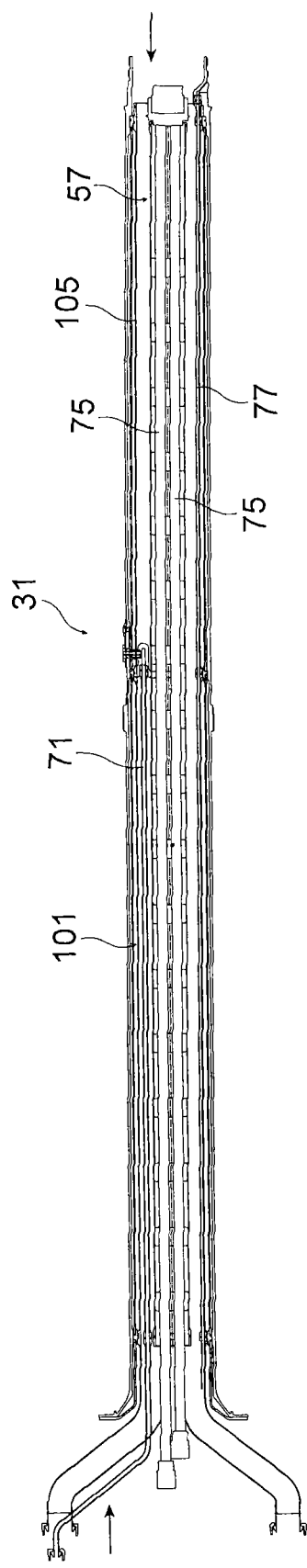
FIG. 5 illustrates the method for mounting the fixed receiver part according to the invention.

With reference to FIG. 5, the method for mounting a fixed part 31 of a receiver 30 of a turbine engine 1 comprises:
   a step for mounting the first distance sleeve 101, along an axis 103 substantially parallel with the axis 3 of the turbine engine 1, whereby the first distance sleeve 101 is made to bear against the first support ring 91 so as to be subsequently able to hold the first support ring 91 in position inside the fixed hollow shaft 57 for carrying ancillary systems 71, 75, 77,
   a step for mounting the assembly for holding ancillary systems in position 90 inside the fixed hollow shaft 57 for carrying ancillary systems 71, 75, 77,
   a step for mounting at least one ancillary system 71, 75, 77 inside the fixed hollow shaft 57 for carrying ancillary systems 71, 75, 77 via at least one through hole 81, 85, 87 of the first support ring 91.

Figure 7:
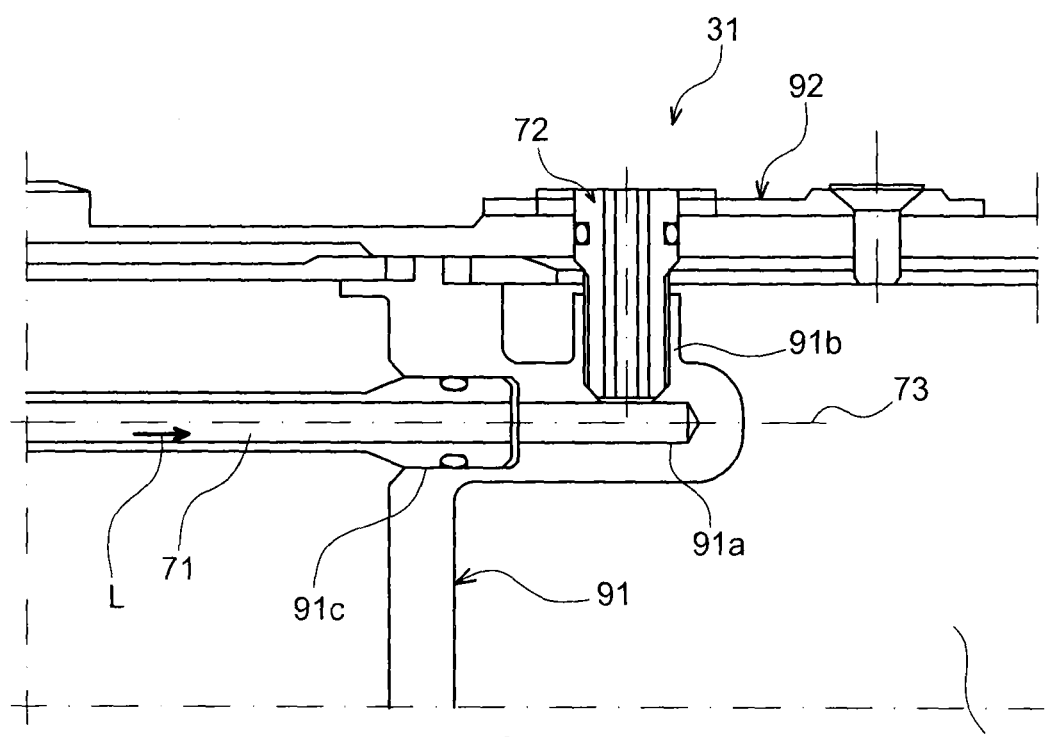
FIG. 7 is a schematic view of a sectional detailed view along a longitudinal median plane of the fixed hollow shaft for carrying ancillary systems of a fixed receiver part at the support ring of the third embodiment of the invention.

With reference to FIGS. 6 and 7, a fixed part 31 of a receiver 30 according to a third embodiment of the invention, which is the preferred embodiment of the invention, is shown. The fixed part 31 of the receiver 30 of the turbine engine 1 is suitable for carrying inside the fixed hollow shaft 57 at least one ancillary system 71 for lubricating rotary shaft bearings 64, 65, 66, 67. The ancillary system 71 is in this case an ancillary system for supplying lubricant to a rotary shaft bearing 64, 65, 66, 67 of the turbine engine 1.

The fixed part 31 of the receiver 30 of the turbine engine 1 also comprises a nozzle 72 rigidly connected to the shaft for carrying ancillary systems 57. The nozzle 72 is designed to spray lubricant, notably oil, radially out of the fixed hollow shaft 57 on the shaft bearing 64, 65, 66, 67 of the turbine engine 1. The nozzle 72 is preferably mounted on the first support ring 91. However, it could also be mounted on another support ring, notably the second or the third support ring 95, 97 according to a similar design.

The first support ring 91 is then notably designed to carry the lubricant from the ancillary system for lubricating the bearing 71 to the nozzle 72. It comprises an inlet duct 91c comprising an orifice for housing the ancillary system 71 for lubricating bearings 64, 65, 66, 67. The ancillary system for lubricating bearings 71 extends for example into the fixed hollow shaft 57 along an axis 73 which is parallel or even merged with the axis 93 of the first support ring 91. It also comprises a transit duct 91a for lubricant L opening onto the inlet duct 91c of the support ring 91 along with an orifice 91b for housing the nozzle 72 opening onto the transit duct 91a for lubricant L. The fixed part 31 of the receiver 30 may also comprise a plate 92 for stopping the nozzle 72 in rotation, designed to be mounted on the fixed hollow shaft 57.

The invention claimed is:

1. A fixed receiver part of a turbine engine comprising a turbine engine axis, the fixed turbine engine receiver part comprising:
   a fixed hollow shaft for carrying ancillary systems of Hall the turbine engine, centered on the turbine engine axis, the turbine engine ancillary systems,
   an assembly for holding the ancillary systems in position, situated inside the fixed hollow shaft for carrying ancillary systems, comprising:
      a first ancillary system support ring, having an axis substantially parallel with the turbine engine axis and an outer surface bearing against an inner surface of the fixed hollow shaft, and
      a first distance sleeve for holding the first ancillary system support ring in position, the first distance sleeve having an axis substantially parallel with the turbine engine axis, the first distance sleeve bearing against the first ancillary system support ring,
   wherein the first ancillary system support ring comprises a plurality of mutually separated through holes, each through hole defining a passage for at least one ancillary system, each through hole being traversed by at least one of the ancillary systems of the turbine engine.

2. The fixed turbine engine receiver part according to claim 1, wherein the first ancillary system support ring comprises at least two complementary assembly segments, each defining, at least in part, at least one of the through holes.

3. The fixed turbine engine receiver part according to claim 2, wherein the first ancillary system support ring comprises three complementary assembly segments, each defining, at least in part, at least one of the through holes.

4. The fixed turbine engine part according to claim 1, wherein the assembly for holding ancillary systems in position comprises a second distance sleeve for holding the first ancillary system support ring in position, the second distance sleeve having an axis substantially parallel with the turbine engine axis, the first ancillary system support ring being locked along the fixed hollow shaft for carrying ancillary systems between the first distance sleeve and the second distance sleeve.

5. The fixed turbine engine receiver part according to claim 1, wherein the assembly for holding ancillary systems in position comprises means for angular locking of the first ancillary system support ring in relation to the first distance sleeve.

6. The fixed turbine engine receiver part according to claim 1, wherein the fixed turbine engine receiver part comprises a first axial stop rigidly connected to the fixed hollow shaft for carrying ancillary systems, the first axial stop bearing against the assembly for holding ancillary systems in position.

7. The fixed turbine engine receiver part according to claim 6, wherein the first axial stop comprises a flexible element.

8. The fixed turbine engine receiver part according to claim 6, wherein the fixed turbine engine receiver part comprises a second axial stop rigidly connected to the fixed hollow shaft for carrying ancillary systems, the second axial stop bearing against the assembly for holding ancillary systems in position,
   the assembly for holding ancillary systems in position being locked inside the fixed hollow shaft for carrying ancillary systems between the first axial stop and the second axial stop.

9. The fixed turbine engine receiver part according to claim 8, wherein the second axial stop comprises an abutment for holding, in position, the assembly for holding ancillary systems in position.

10. The fixed turbine engine receiver part according to claim 8, wherein the assembly for holding ancillary systems in position comprises a second ancillary system support ring and a third ancillary system support ring, each support ring having an axis substantially parallel with the turbine engine axis, each ancillary system support ring comprising a plurality of mutually separated through holes, each through hole defining a passage for at least one ancillary system, each through hole being traversed by at least one of the ancillary systems of the turbine engine, the second ancillary system support ring being locked between the first axial stop and the first distance sleeve, the third ancillary system support ring being locked between a second distance sleeve for holding the first ancillary system support ring in position and the second axial stop.

11. The fixed turbine engine receiver part according to claim 10, wherein the second axial stop comprises an internal flexible element situated between an inner wall of the fixed inflow shaft and the third ancillary system support ring with which the internal flexible element is in contact, the internal flexible element being designed to maintain tightness between the third ancillary system support ring and the fixed hollow shaft.

12. A turbine engine comprising an open rotor contra-rotating tandem propeller receiver comprising a fixed receiver part according to claim 1.

13. A method for mounting a fixed turbine engine receiver part according to claim 1, wherein the mounting method comprises:
   mounting the first distance sleeve, along an axis substantially parallel with the turbine engine axis, whereby the first distance sleeve is made to bear against the first ancillary system support ring so as to be subsequently able to hold the first ancillary system support ring in position inside the fixed hollow shaft for carrying ancillary systems;
   mounting the assembly for holding ancillary systems in position inside the fixed hollow shaft for carrying ancillary systems; and
   mounting at least one ancillary system inside the fixed hollow shaft for carrying ancillary systems via at least one through hole of the first ancillary system support ring.

\* \* \* \* \*